F. CAREY.
FISHING REEL.
No. 11,006. Reissued June 11, 1889.
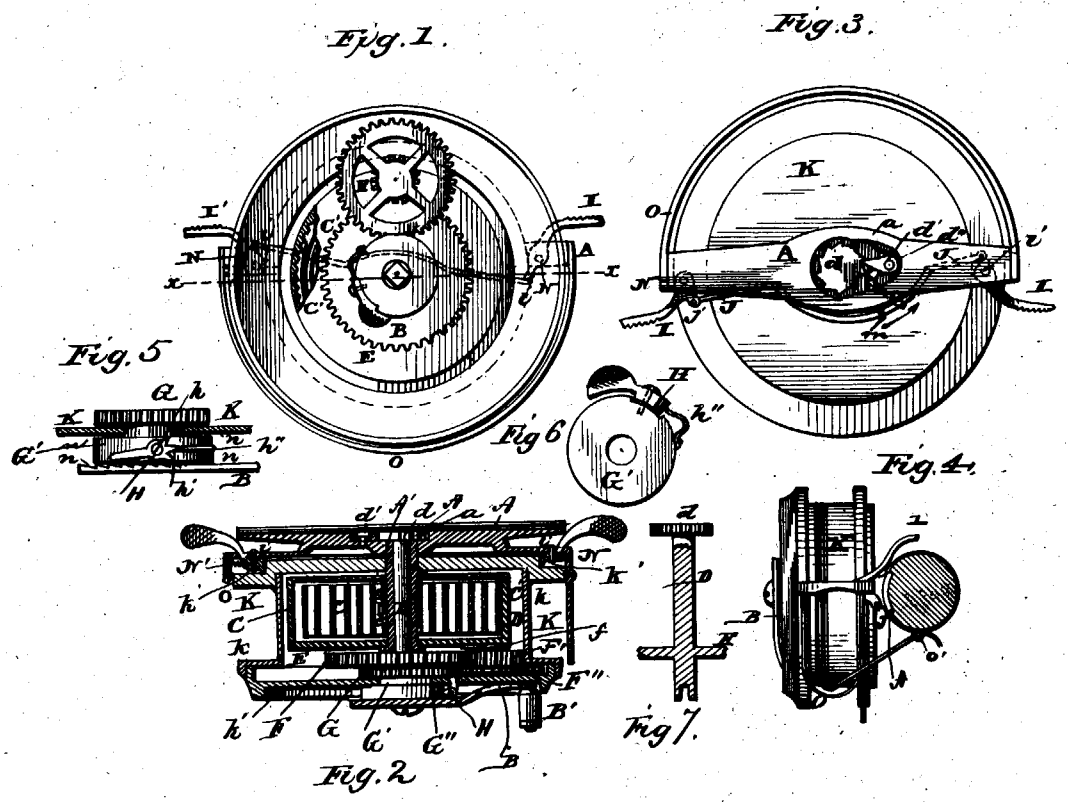
WITNESSES
F. L. Ourand
Fred G. Dieterich
INVENTOR
Frank Carey
Wm. R. Singleton
Attorney

UNITED STATES PATENT OFFICE.

FRANK CAREY, OF PENN YAN, NEW YORK.

FISHING-REEL.

SPECIFICATION forming part of Reissued Letters Patent No. 11,006, dated June 11, 1889.

Original No. 402,653, dated May 7, 1889. Application for reissue filed May 20, 1889. Serial No. 311,350.

*To all whom it may concern:*

Be it known that I, FRANK CAREY, a citizen of the United States, residing at Penn Yan, in the county of Yates and State of New York, have invented certain new and useful Improvements in Fishing-Reels, of which the following is a specification, reference being had therein to the accompanying drawings.

This invention relates to certain improvements in reels for fishing-rods, which will be hereinafter more fully described, and pointed out in the claims.

In the accompanying drawings, forming part of this specification, Figure 1 is a front view of the inside, the cap being removed. Fig. 2 is a transverse section on *x x*, Fig. 1. Fig. 3 is a rear view showing the double brake. Fig. 4 is a view of the reel attached to a rod. Fig. 5 is an end view of the detaching device. Fig. 6 is an end view of Fig. 5. Fig. 7 is a detached sectional view of the shaft D.

A is the plate by which the reel is secured to the rod.

B is the crank, and B′ the handle by which the shaft D is operated.

C is a flat coiled spring having its loose outer end corrugated, as seen in Fig. 1 at C′.

D is the central shaft, on the end of which the crank B is secured and by which it is rotated.

E is a case or barrel holding the coiled spring C. The entire inner surface of the rim of the case E is corrugated to correspond with the corrugations on the end of spring C.

F is a spur-gear secured to shaft D.

F′ is a pinion working loosely on a stud *f*, attached to the outside of case E.

F″ is another spur-gear attached to pinion F′ and rotating with it on stud *f*.

G is a spur-gear attached to the drum or sleeve G′.

K is the case, made practically water-tight, in which all the machinery is inclosed. Its outer rim is grooved for winding the line.

I I′ are two brake-levers pivoted at *i i* to the rod-plate A, and each one bearing on the case K within the recess or rabbet *k*′. A small spring *i*′ *i*′ is placed behind each one to keep it in place.

J is a connecting-rod between the brakes I I′, so that either being used the other will act with it.

A′ is a hollow spindle rigidly attached to the rod-plate A, and in which the central shaft D rotates freely. The spring C is detachably secured at its inner end to the hollow spindle A′ at *c*″. This is accomplished by means of a slit so arranged that as the spring is revolved in one direction the slit will engage the hook, but when revolved in the opposite direction the hook will become detached from the spring. The corrugated end of the spring C matches the corrugations on the inner surface of the rim of barrel or case E.

*d* is a ratchet-wheel attached to the inner end of the central shaft D, and works in the recess *a* in the plate A. A pawl *d*′ is pivoted in recess *a*, and prevents the ratchet *d* from turning backward, but permits it to turn in the other direction. A spring *d*″ controls the pawl *d*′.

The shaft D, having on its inner end the ratchet *d*, has fixed to it outside of the case E the spur-gear F, which meshes with the pinion F′, to which is attached the spur F″, which meshes with the spur-gear G on the drum or sleeve G′, which revolves freely around the central shaft D. This drum or sleeve G′ has a circular groove G″, in which is inserted the front plate of the case K. On the outer face of this plate K is a circle of notches *n*, and on the corresponding inner face of the crank B there is also a circle of notches *n*′. (See Fig. 5.) On the circumference of the drum G′ is pivoted a bifurcated pawl or click H, having the two points *h h*′ to engage the notches *n n*′. The spring *h*″ is so placed that its end is fitted to a projection between the points *h h*′ to keep the pawl H in either position.

Forward motion is imparted to the central shaft D by the crank B, and through the intermediate gears F F′ F″ to G. If no resistance were offered to the running of G and its attached drum, the gears would turn freely; but when it is desired to detach this machinery from the case K the small spring *h*″ will hold the pawl H in either of the two positions. The case K can be held stationary by the double clutch-brake I I′. Therefore the force is exerted upon all points, and moves in the line of least resistance—viz., winds the spring C by revolving the barrel E.

The barrel E turns loosely upon the hollow spindle A′, and as the inner surface of the rim of E is corruguted, these corrugations can catch the corrugated end of spring C, and retain the spring to a certain extent, giving sufficient resistance to wind the spring before its resilience will cause it to slide over the surface within the barrel E. This arrangement causes the length of line controlled by the reel to be limited only by the capacity of the spool. As the crank is turned forward, the pawl *d'* works upon the ratchet *d* and prevents any backward movement of the crank B. The spring C can be thus either fully or partly wound up.

The brakes offer but slight resistance to the backward motion of the case K, as in reeling off the line; and if the brake-lever be depressed sufficiently to bring the connecting-rod J on the center of the bearing of the lever I it will remain in such position until released. With the brake so locked and the small lever *m*, Fig. 3, thrown forward, and a hand on the crank-handle B' and a fish on the hook, the angler is in direct communication with his quarry through the tension of the spring C and connecting-gears, which will regain the line faster than any fish can slacken it. It will also keep a uniform tension upon the line, however rapid the movements of the fish may be. The double pawl H may be made to engage the inner face of the crank B, when the machinery will be locked, and the case K or spool may revolve freely in either direction. The double brake renders it quite as convenient to use the reel above as below the hand-grip of the rod, and this is a feature which will commend itself to all sportsmen. A wire guard O, Fig. 3, passes half-way around on the under side of the disk next to plate A, and is designed to keep the reel from fouling with the bottom of a boat or other surface upon which it may be laid. The line-guard *o* serves the purpose of keeping the line from running over the edges of the spool when being wound upon it, and is constructed with a wide ring *o'*.

I claim—

1. In a fishing-reel, a spring-case having corrugations on the inner side of the rim, and a coiled spring in said case having its inner end detachably secured to a sleeve upon which said case is journaled and having its outer end curved or hooked to engage with the corrugations in the rim, substantially as described.

2. In a fishing-reel, the double brake consisting of levers I I', connected by the rod J, pivoted at the opposite ends of the arms on the rod-plate, to operate the same above or below the reel, in combination with the exterior surface of the reel-case, substantially as described.

3. In a fishing-reel, the combination of the crank B and reel-case K, each provided with a ratchet and a shifting-pawl H and spring *h''*, whereby either rack may be engaged and held by the pawl and the other released, substantially as described.

4. In a fishing-reel, the combination of the ratchet-wheel *d*, pawl *d'*, and check-lever *m*, whereby the shaft D is controlled by holding or releasing the ratchet *d* on the end thereof, substantially as described.

In testimony whereof I affix my signature in presence of two witnesses.

FRANK CAREY.

Witnesses:
W. W. SMITH,
ELI MCCONNELL.